United States Patent
Lambert et al.

(10) Patent No.: US 12,184,793 B2
(45) Date of Patent: Dec. 31, 2024

(54) HSM-MEMORY-EFFICIENT MEANS OF PROVIDING HSM-BASED PKI OPERATIONS FOR VEHICLE CONTROLLERS

(71) Applicant: Robert Bosch GmbH, Stuttgart (DE)

(72) Inventors: Robert Lambert, Cambridge (CA); Tobias Klein, Bochum (DE); Andrew Inwood, Waterloo (CA)

(73) Assignee: Robert Bosch GmbH, Stuttgart (DE)

( * ) Notice: Subject to any disclaimer, the term of this patent is extended or adjusted under 35 U.S.C. 154(b) by 438 days.

(21) Appl. No.: 17/495,342

(22) Filed: Oct. 6, 2021

(65) Prior Publication Data

US 2023/0104332 A1    Apr. 6, 2023

(51) Int. Cl.
*H04L 9/32* (2006.01)
*G06F 3/06* (2006.01)
*H04L 9/00* (2022.01)

(52) U.S. Cl.
CPC .......... *H04L 9/3265* (2013.01); *G06F 3/0604* (2013.01); *G06F 3/0659* (2013.01); *G06F 3/0673* (2013.01); *H04L 9/006* (2013.01); *H04L 9/3242* (2013.01); *H04L 9/3268* (2013.01)

(58) Field of Classification Search
CPC ..... H04L 9/3265; H04L 9/006; H04L 9/3242; H04L 9/3268; G06F 3/0604; G06F 3/0659; G06F 3/0673
See application file for complete search history.

(56) References Cited

U.S. PATENT DOCUMENTS

| | | | |
|---|---|---|---|
| 7,137,142 B2 | 11/2006 | Puhl et al. | |
| 8,675,875 B2 | 3/2014 | Yellepeddy et al. | |
| 9,065,820 B2 | 6/2015 | Leggette et al. | |
| 10,728,249 B2 | 7/2020 | Markham | |
| 11,533,185 B1* | 12/2022 | Sharma | H04L 9/3263 |
| 11,576,037 B2* | 2/2023 | Sun | H04W 12/069 |
| 2010/0313014 A1 | 12/2010 | Medvinsky et al. | |
| 2016/0191253 A1* | 6/2016 | Pyle | H04L 63/0823 380/28 |

(Continued)

OTHER PUBLICATIONS

Khodaei et al., "Towards Deploying a Scalable & Robust Vehicular Identity and Credential Management Infrastructure", Jan. 5, 2016 (8 pages).

(Continued)

*Primary Examiner* — Philip J Chea
*Assistant Examiner* — Ghizlane Maazouz
(74) *Attorney, Agent, or Firm* — Maginot, Moore & Beck LLP (57) ABSTRACT

A method for certificate chain validation is disclosed for memory-efficient execution inside a secure execution environment of a hardware security module (HSM), despite very limited memory being inside the HSM. This is achieved by allocating enough HSM memory for at least the root certificate, a signer certificate, and a certificate to be validated, and replacing the signer certificate as the certificate chain is traversed. Revalidation of data is implemented by computing secure tags that enable the HSM to quickly recognize previously validated data. Chain validation is only considered provisional until checked against a CRL, which can be provided to the HSM in a streaming fashion, and each received serial number in the CRL is checked against the list of serial numbers representing the provisionally verified chain.

16 Claims, 7 Drawing Sheets

(56) References Cited

U.S. PATENT DOCUMENTS

| | | | |
|---|---|---|---|
| 2020/0154272 A1* | 5/2020 | Uy | H04W 12/08 |
| 2021/0105143 A1 | 4/2021 | Unagami et al. | |
| 2021/0344514 A1* | 11/2021 | Barrett | H04L 9/3268 |
| 2021/0392002 A1* | 12/2021 | Gray | H04L 9/3268 |
| 2022/0060341 A1* | 2/2022 | Ounsworth | H04L 9/007 |
| 2023/0291574 A1* | 9/2023 | Held | H04L 9/0825 |
| 2023/0327886 A1* | 10/2023 | Shin | H04L 9/0643 |
| | | | 713/171 |

OTHER PUBLICATIONS

Mundhenk et al., "Security in Automotive Networks: Lightweight Authentication and Authorization", Mar. 15, 2017, vol. 22, No. 2, Article 25 (25 pages).

Liu et al., "An Identity-Based Batch Verification Scheme for VANETs Based on Ring Signature with Efficient Revocation", Mar. 13, 2021 (11 pages).

\* cited by examiner

HSM-MEMORY-EFFICIENT MEANS OF PROVIDING HSM-BASED PKI OPERATIONS FOR VEHICLE CONTROLLERS

FIELD

The device and method disclosed in this document relates to hardware security modules and, more particularly, to memory-efficient cryptographic operations on a hardware security module.

BACKGROUND

Unless otherwise indicated herein, the materials described in this section are not admitted to be the prior art by inclusion in this section.

Vehicle controllers in modern vehicles are often provided with hardware security modules (HSMs). HSMs are separate compute environments in which secure operations can be performed and in which sensitive data is kept secure from spying and interference, from both external entities as well as from other processors in the vehicle controller itself. Sensitive data may include digital certificates, public keys, private keys, symmetric keys, nonces, and secure counters. However, vehicle controllers are often cost-optimized and, as a result, the amount of data which can be securely located in the HSM of typical vehicle controller is not large. The total memory available to the HSM of a typical vehicle controller is often in the hundreds of kilobytes. In addition to the sensitive data, this limited total memory must contain the program code of the HSM itself.

Vehicle controllers in modern vehicles have increasingly made use of a Public-Key Infrastructure (PKI) to secure their software integrity, updates, and communications. The certificates of the PKI, which potentially need to be stored in the HSM, typically require some small number of kilobytes each. Thus, it often becomes impossible to store all of the sensitive data inside the HSM, such as the PKI certificates, cryptographic keys, and other data, in addition to the program code of the HSM. This means that, in typical vehicle controllers, much of the sensitive data—usually the bulk of the PKI certificate hierarchy—is stored outside of the HSM in a less secure storage environment. As a result, sensitive calculations involving the PKI certificates are often disadvantageously performed outside of the secure execution environment provided by the HSM. Alternatively, vehicle controllers that do perform such calculations inside the HSM are constrained by the limited number of certificates that can be stored in the HSM.

This problem is compounded by the trend for vehicle OEMs to align the design of vehicle controller security architecture with the existing security architecture of the public internet, resulting in the adoption of X.509 certificates for vehicle PKI. The size of an X.509 certificate is typically more than a thousand bytes, greatly increasing the total size of a PKI certificate tree. Furthermore, vehicle OEMs are increasingly deploying multi-level PKIs, with sub-certificate-authorities (sub-CAs) below an OEM root certificate authority, as well as utilizing multiple different signing entities for different purposes, such as software signing, calibration signing, certificate revocation list signing, and signing for other specific components, resulting in an even larger collection of PKI certificates that need to be authentically maintained.

Moreover, in addition to the use of a large number of certificates by vehicle OEMs, any of the certificates in the PKI certificate hierarchy can be revoked by the use of signed lists, usually certificate revocation lists. The number of certificates enumerated in these lists can potentially grow very large, even if only a small fraction of the issued certificates are revoked. Finally, in some applications, such as so-called 'vehicle to everything' (V2X) communications, the number of certificates issued is very large, with each vehicle being issued multiple thousands of certificates during its lifetime. In such applications, the difficulty of keeping both certificates and revocation information inside the HSM is even further heightened.

Accordingly, what is needed is a method for performing cryptographic operations, in particular certificate validations, using an HSM in a memory-efficient manner for HSMs having only a very limited amount of memory.

SUMMARY

A method for using a hardware security module is disclosed. The method comprises identifying a first certificate chain comprising a root certificate and a plurality of subordinate certificates. The method further comprises validating, with the hardware security module, the first certificate chain by validating each respective subordinate certificate in the plurality of subordinate certificates. The validation of each respective subordinate certificate comprises receiving, and storing in a memory of the hardware security module, a first certificate in a respective certificate pair including (i) the respective subordinate certificate and (ii) a respective signer certificate of a respective entity that issued the respective subordinate certificate. The validation of each respective subordinate certificate further comprises storing, in the memory of the hardware security module, a second certificate in the respective certificate pair that was previously received by the hardware security module. The validation of each respective subordinate certificate further comprises verifying a signature of the respective subordinate certificate using the respective signer certificate. The validation of each respective subordinate certificate further comprises deleting, after verifying the signature, the second certificate from the memory of the hardware security module if the second certificate is one of the plurality of subordinate certificates.

A further method for using a hardware security module is disclosed. The method comprises identifying a first certificate chain comprising a root certificate and a plurality of subordinate certificates. The method further comprises validating, with the hardware security module, the first certificate chain by validating each respective subordinate certificate in the plurality of subordinate certificates. The validation of each respective subordinate certificate comprises verifying a signature of the respective subordinate certificate using a respective signer certificate of a respective entity that issued the respective subordinate certificate. The validation of each respective subordinate certificate further comprises calculating, in response to the respective subordinate certificate being successfully verified, a respective cryptographic value based on the respective subordinate certificate using a cryptographic function. The validation of each respective subordinate certificate further comprises storing the respective cryptographic value in a first data structure in the memory of the hardware security module. The method further comprises revalidating, with the hardware security module, a particular subordinate certificate in the plurality of subordinate certificates by recalculating the respective cryptographic value based on the particular subordinate certificate using the cryptographic function.

Yet another method for using a hardware security module is disclosed. The method comprises identifying a first certificate chain comprising a root certificate and a plurality of subordinate certificates. The method further comprises validating, with the hardware security module, the first certificate chain by validating each respective subordinate certificate in the plurality of subordinate certificates. The validation of each respective subordinate certificate comprises receiving, and storing in a memory of the hardware security module, the respective subordinate certificate. The validation of each respective subordinate certificate further comprises storing, in the memory of the hardware security module, a respective signer certificate of a respective entity that issued the respective subordinate certificate, the respective signer certificate having been previously received by the hardware security module. The validation of each respective subordinate certificate further comprises verifying a signature of the respective subordinate certificate using the respective signer certificate. The validation of each respective subordinate certificate further comprises deleting, after verifying the signature, the respective signer certificate from the memory of the hardware security module if the second certificate is one of the plurality of subordinate certificates.

BRIEF DESCRIPTION OF THE DRAWINGS

The foregoing aspects and other features of the methods are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

Figure 1:
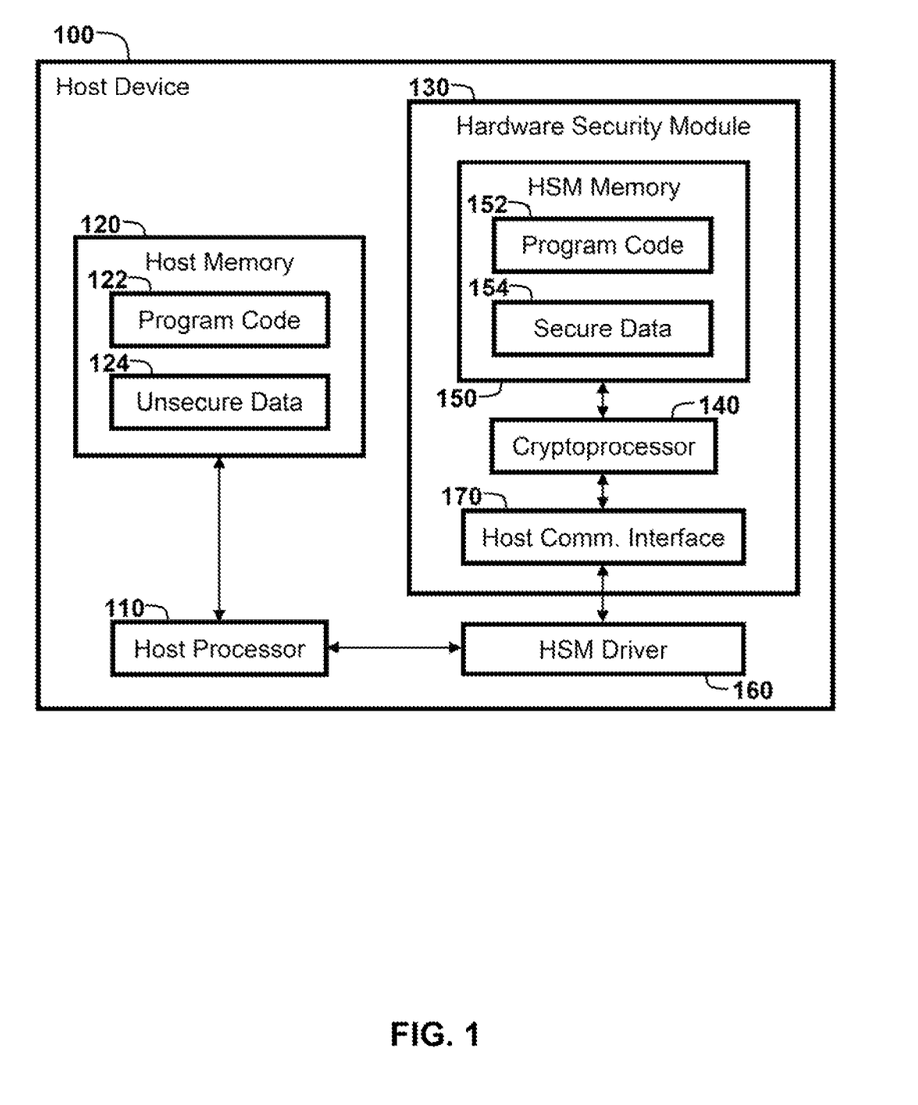
FIG. 1 shows an exemplary host device that incorporates a hardware security module for cryptographic operations.

FIG. 1 shows an exemplary host device 100 that incorporates a hardware security module for cryptographic operations. In at least one embodiment, the host device 100 is a vehicle controller, in particular a vehicle electronic control unit (ECU). However, it will be appreciated by those of ordinary skill that the systems and methods described herein are equally applicable to any computing device that incorporates a hardware security module for cryptographic operations.

The host device 100, which may also be referred to as a host controller or host computer, at least includes at least one host processor 110 and at least one host memory 120. It will be recognized by those of ordinary skill in the art that a "processor" includes any hardware system, hardware mechanism or hardware component that processes data, signals or other information. Accordingly, the host processor 110 may comprise a central processing unit, graphics processing units, multiple processing units, dedicated circuitry for achieving functionality, programmable logic, or other processing systems. The host memory 120 may be of any types of devices capable of storing information accessible by the host processor 110, such as a flash memory card, ROM, RAM, hard drives, discs, or any of various other computer-readable medium serving as volatile or non-volatile data storage devices, as will be recognized by those of ordinary skill in the art. In at least one embodiment, the host memory 120 includes both volatile memory and non-volatile memory.

The host memory 120 stores program code 122 and unsecure data 124. The program code 122 includes program code for performing any number of operations of the host device 100, depending on the application and context of the host device 100. Moreover, the program code 122 at least includes program code for receiving or retrieving certificates, in particular public-key infrastructure (PKI) certificates, which are required or otherwise useful in the performance of the various operations of the host device 100. In one embodiment, the PKI certificates comprise X.509 certificates. The receipt of such certificates by the host device 100 is generally accomplished by communications over the public Internet, via one or more network communications devices (not shown) of the host device 100, or by communications via private network and through diagnostic access systems. These certificates are stored in the unsecure data 124 of the host memory 120, among other data of the host device 100.

The host device 100 further includes a hardware security module (HSM) 130 for performing for cryptographic operations and storing sensitive data in a secure manner. The HSM 130 generally takes the form of a computer-on-a-chip, a microprocessor, or a microcontroller, which is embedded in a packaging or housing having multiple physical security measures that provide tamper resistance, tamper evident qualities, or tamper-detecting features.

The HSM 130 at least includes at least one cryptoprocessor 140 and at least one HSM memory 150. It will be recognized by those of ordinary skill in the art that a "processor" includes any hardware system, hardware mechanism or hardware component that processes data, signals or other information. Accordingly, the cryptoprocessor 140 may comprise a central processing unit, graphics processing units, multiple processing units, dedicated circuitry for achieving functionality, programmable logic, or other processing systems. The HSM memory 150 may be of any types of devices capable of storing information accessible by the cryptoprocessor 140, such as a flash memory card, ROM, RAM, hard drives, discs, or any of various other computer-readable medium serving as volatile or non-volatile data storage devices, as will be recognized by those of ordinary skill in the art. The HSM memory 150 is advantageously only accessible by the cryptoprocessor 140 and cannot be read or written to by any other controller or device (e.g., by the host processor 110 of the host device 100). In at least one embodiment, the HSM memory 150 includes both volatile memory (e.g., RAM) and non-volatile memory (e.g., DFLASH and/or PFLASH).

The HSM memory 150 stores program code 152 and secure data 154. The program code 122 includes program code for performing any number of cryptographic operations that might be required by the host device 100, at least including validating a certificate chain of a respective certificate, in particular of a respective PKI certificate (e.g., a X.509 certificate). The secure data 154 of the HSM memory 150 generally stores, at any given point in time, one or more certificates, cryptographic keys, or other cryptographic data necessary for validating a certificate chain and for performing any number of other cryptographic operations requested by the host device 100.

Finally, the host device 100 further includes an HSM driver 160 configured to facilitate communications between the host processor 110 and the HSM 130. The HSM driver 160 interconnects with a host communication interface 170 of the HSM 130. As an example, when a cryptographic operation is required to be performed, the host processor 110 operates the HSM driver 160 communicate commands and the necessary data, including cryptographic data such as certificates or keys, to the HSM 130. The HSM 130 receives commands and the necessary data from the host processor 110 via the host communication interface 170 and cryptoprocessor 140 executes the requested cryptographic operations in a secure execution environment.

Methods for HSM Memory-Efficient Certificate Cryptography

A variety of methods and processes are described below for operating the HSM 130 and/or the host device 100 to perform cryptographic operations, at least including certificate chain validation. In these descriptions, statements that a method, processor, and/or system is performing some task or function refers to a controller or processor (e.g., the host processor 110 or the cryptoprocessor 140) executing programmed instructions (e.g., the program code 122 or the program code 152) stored in non-transitory computer readable storage media (e.g., the host memory 120 or the HSM memory 150) operatively connected to the controller or processor to manipulate data or to operate one or more components in the host device 100 or the HSM 130 to perform the task or function. Additionally, the steps of the methods may be performed in any feasible chronological order, regardless of the order shown in the figures or the order in which the steps are described.

Figure 2:
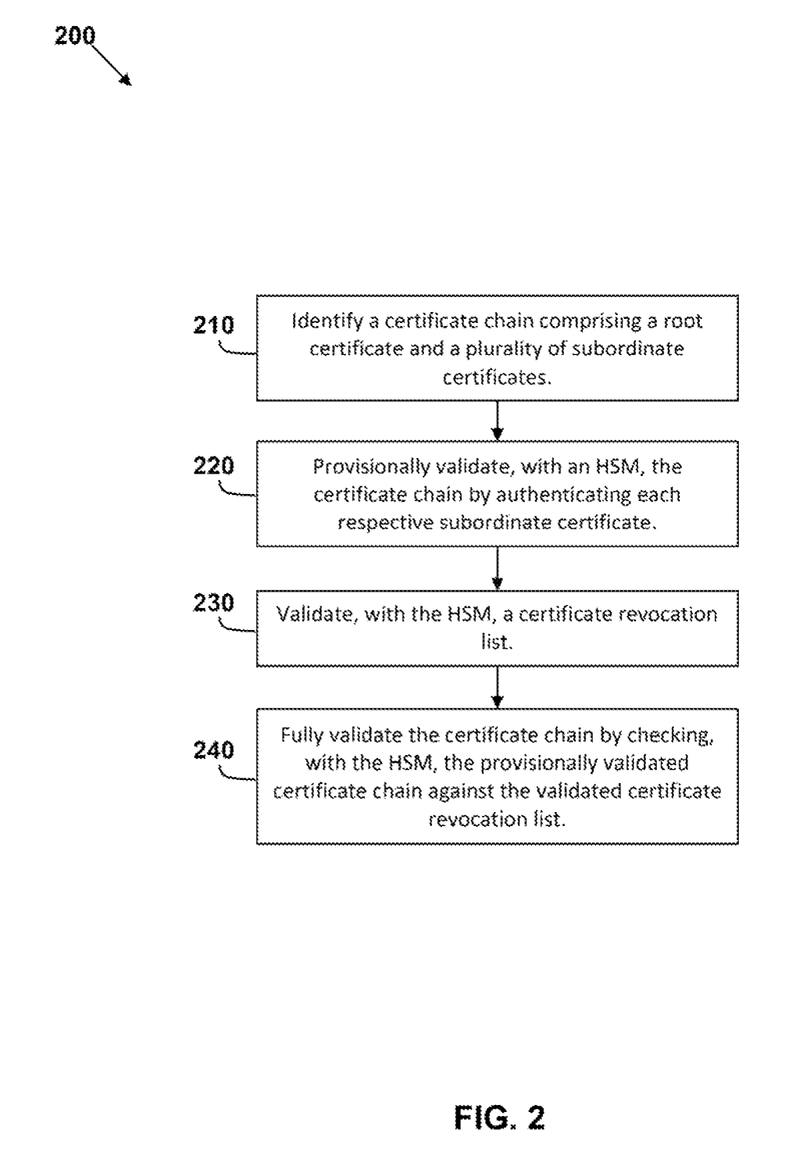
FIG. 2 shows a method for certificate chain validation using a hardware security module.

FIG. 2 shows a method 200 for certificate chain validation using a hardware security module. It will be appreciated by those of ordinary skill in the art that certificate chain validation refers to the verification of all of the signatures in a certificate chain from a root certificate down to a leaf certificate in a certificate tree.

The method 200 begins with identifying a certificate chain comprising a root certificate and a plurality of subordinate certificates (block 210). Particularly, the host processor 110 of the host device 100 (or the cryptoprocessor 140 of the HSM 130) identifies a certificate chain that is to be validated. In general, the certificate chain that is to be validated is that of a respective certificate that is to be used for a cryptographic operation requested by the host device 100. A certificate chain is a set of certificates comprising a root certificate and one or more subordinate certificates, in which there is a chain of issuance/signature from the root certificate to a lowest level subordinate certificate. The root certificate is a certificate that identifies a root certificate authority (CA). The root certificate is self-signed by the root certificate authority and establishes a root of trust in a PKI. In at least one embodiment, the HSM 130 is provisioned with some number of root certificates, which it will trust, in a secure way, typically in an initial secure environment. In contrast, each subordinate certificate has been either (i) issued by the root CA identified by the root certificate or (ii) issued by an intermediate entity identified by another of the subordinate certificates (e.g., a subordinate CA). The certificate chain to be validated is generally part of a larger multi-level certificate tree.

Figure 3:
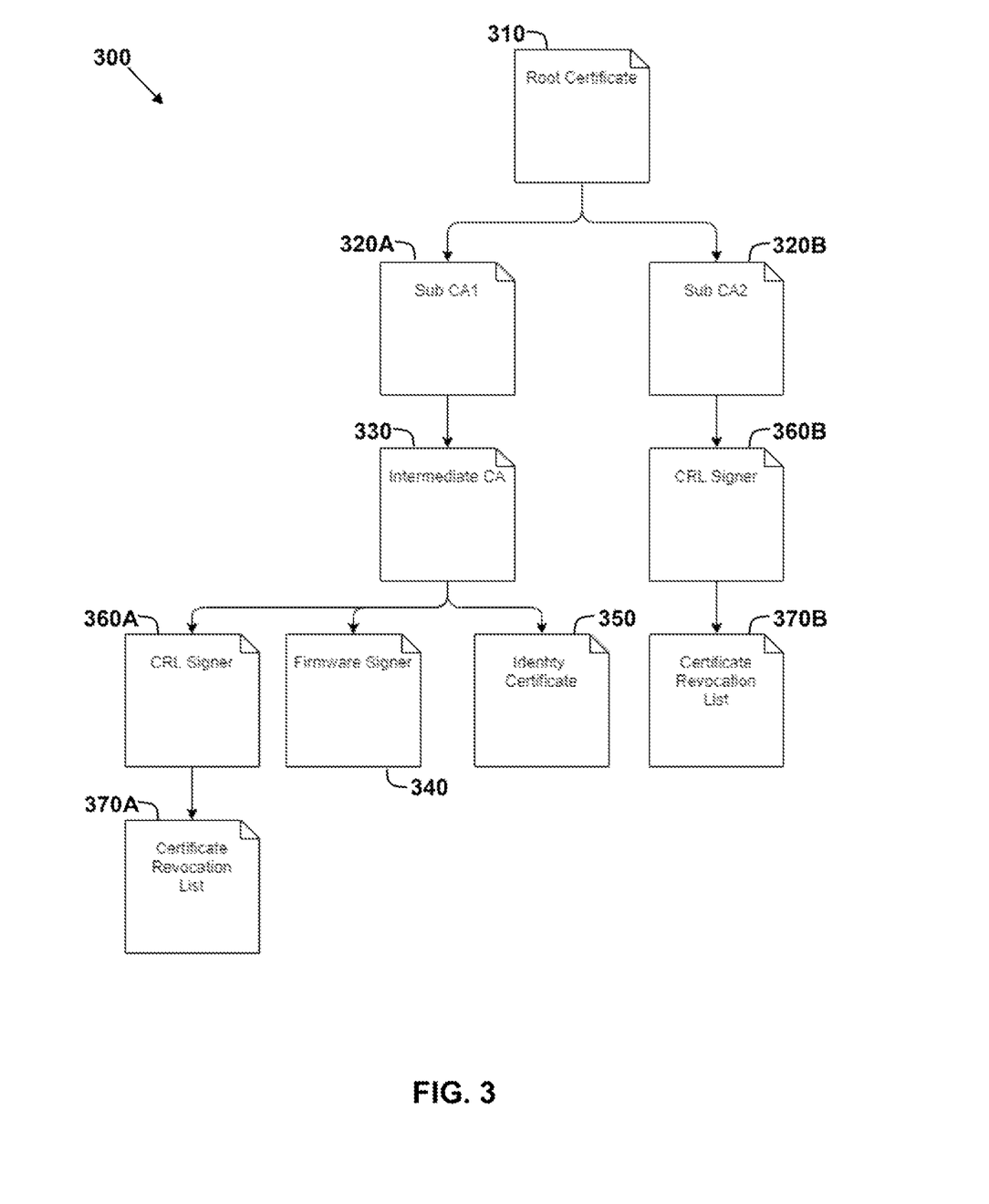
FIG. 3 shows an exemplary multi-level certificate tree.

FIG. 3 shows an exemplary multi-level certificate tree 300. At the root of the certificate tree 300 is a root certificate 310 that identifies a root CA. The certificate tree 300 further includes subordinate CA certificates 320A and 320B, which are issued by the root CA and identify a first subordinate CA and a second subordinate CA, respectively. The certificate tree 300 further includes an intermediate CA certificate 330, which is issued by the first subordinate CA and identifies an intermediate CA. The certificate tree 300 further includes a firmware signer certificate 340, which is issued by the intermediate CA and identifies a firmware signing entity. The certificate tree 300 further includes an identity certificate 350, which is issued by the intermediate CA and identifies a subject entity. Additionally, the certificate tree 300 includes certificate revocation list (CRL) signer certificates 340A and 340B, which are issued by the intermediate CA and the second subordinate CA, respectively. The CRL signer certificates 340A and 340B identify a first CRL issuing entity and a second CRL issuing entity, respectively. Finally, the certificate tree 300 further includes CRLs 370A and 370B, which are issued by the first CRL issuing entity and the second CRL issuing entity, respectively In the example of FIG. 3, the firmware signer certificate 340 or the identity certificate 350 may need to be validated prior to usage of the public key contained therein. In order to validate the identity certificate 350, the certificate chain of the identity certificate 350 must be identified and then validated.

In order to identify the certificate chain of a respective certificate (e.g., a certificate to be used in some cryptographic operation requested by the host device 100), the processor 110 and/or the cryptoprocessor 140 begins by identifying the issuing entity of the respective certificate and, then, identifying or retrieving the certificate of that issuing entity. In this same manner, the processor 110 and/or the cryptoprocessor 140 iteratively traverses up the certificate tree, identifying each certificate in the certificate chain of the respective certificate until the root certificate is reached.

In each case, the issuing entity of a certificate is listed in the data of the certificate. Particularly, as will be understood by those of ordinary skill in the art, a certificate generally comprises, among other things, at least (1) a public key of the subject entity to which the certificate was issued, (2) a digital signature of issuing entity that issued the certificate, and (3) identifying information about subject entity and issuing entity. A certificate will generally include additional data such as a serial number of the certificate, a validity period of the certificate, information identifying an encryption algorithm of the public key, and information identifying a signature algorithm of the digital signature.

Figure 5:
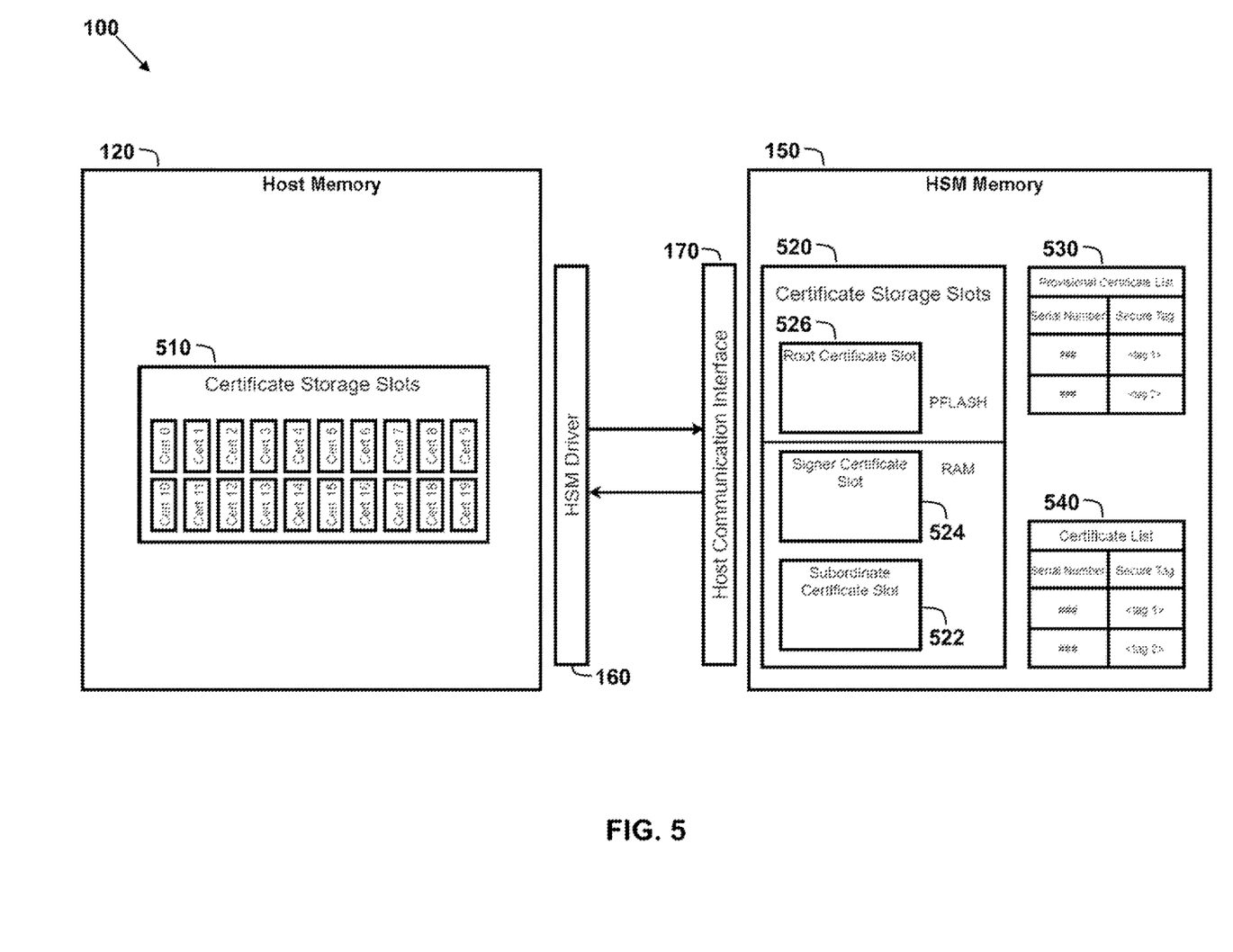
FIG. 5 illustrates exemplary memory usage of a host device and of a hardware security module during provisional chain validation.

If the certificates of the certificate chain that is to be validated are not already available in the host memory 120, the host processor 110 retrieves a copy of each certificate in the certificate chain and stores the copy of each certificate in the certificate chain in the host memory 120, in particular in the certificate storage slots 510. The retrieval of such certificates by the host processor 110 is generally accomplished by looking for the certificates in host memory 120 or by communications over the public Internet, via one or more network communications devices (not shown) of the host device 100.

Returning to FIG. 2, the method 200 continues with provisionally validating the certificate chain, with an HSM, by sequentially validating each respective subordinate certificate (block 220). Particularly, once the certificate chain is identified, the certificate chain can be provisionally validated by at least validating each subordinate certificate in the certificate chain. More particularly, each respective subordinate certificate of the certificate chain is validated by at least verifying the signature of the respective subordinate certificate. If each respective subordinate certificate is determined to be valid, that is to say has a verified signature by from the respective issuing entity, then the certificate chain can be considered provisionally validated. However, the certificate chain cannot be considered fully validated until the certificate chain is checked against a valid certificate revocation list (as will be discussed below with respect to block 240).

Rather than performing the provisional validation of the certificate chain with the host processor 110 using the host memory 120, the provisional validation of the certificate chain is instead performed with the secure execution environment of the HSM 130. However, in some applications, due to optimizations of cost or otherwise, the HSM 130 may have limited very limited memory for storing certificates of the certificate chain that is to be validated. In particular, the HSM 130 may have insufficient memory to store the entirety of the certificate chain that is to be validated.

Figure 4:
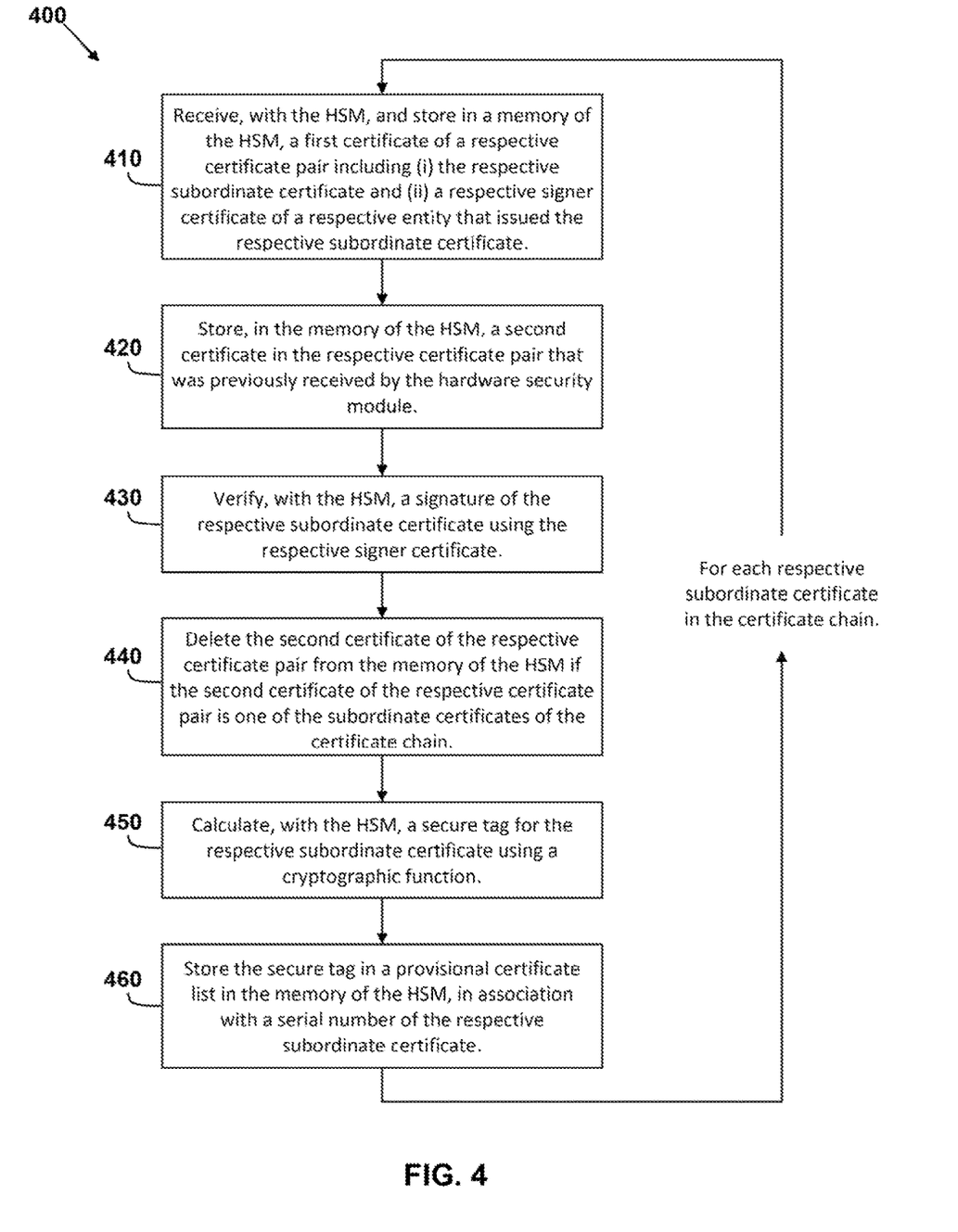
FIG. 4 shows a method for provisionally validating a certificate chain in a memory-efficient manner.

FIG. 4 shows a method 400 for provisionally validating a certificate chain in a memory-efficient manner. The method 400 is advantageously adapted for performance in the secure execution environment of an HSM (e.g., the HSM 130) having very limited memory for storing certificates of the certificate chain that is to be validated and, in particular, an HSM having insufficient memory to store the entirety of the certificate chain that is to be validated. The method 400 advantageously enables a certificate chain to be validated while storing as few as only two certificates at any point in time during the certificate validation process.

Particularly, FIG. 5 illustrates exemplary memory usage of the host device 100 and of the HSM 130 during provisional chain validation. As can be seen, the host memory 120 and the HSM memory 150 have certificate storage slots 510 and 520, respectively or, in other words, portions of memory at least temporarily dedicated to the storage of certificates. The certificate storage slots 510 in the non-volatile memory of the host memory 120 permanently or semi-permanently store a large number of certificates (e.g., certificates 0-19). In contrast, the certificate storage slots 520 in the HSM memory include only a few dedicated certificate storage slots for temporary certificate storage (e.g., in RAM). The certificate storage slots 520 at least include a subordinate certificate slot 522 that stores a respective subordinate certificate that is being validated at a particular iteration of the method 400 and a signer certificate slot 544 that identifies the signer/issuer entity that signed and issued the respective subordinate certificate. As described below, the method 400 advantageously validates each certificate in the certificate chain sequentially and needs only to temporarily store the pair of certificates involved in each validation process in the sequence.

Additionally, in the illustrated example, the certificate storage slots 520 further include a root certificate slot 526 that permanently or semi-permanently stores a root certificate (e.g., in PFLASH or DFLASH). However, the method 400 does not strictly rely on the root certificate being available in this root certificate slot, and permanent availability of the root certificate can optionally be omitted in some implementations.

Returning to FIG. 4, in summary, the method 400 includes sequentially verifying the signature of each subordinate certificate in the certificate chain. Thus, the method 400 comprises a sequence of signature verifications requiring, in each case, a respective certificate pair including (i) the subordinate certificate having the signature to be verified and (ii) the signer certificate of the entity that issued the subordinate certificate having the signature to be verified. In principle, this sequence of signature verifications may proceed in any order, at least including (1) a forward direction through the certificate chain from root to leaf or (2) an reverse direction through the certificate chain from leaf to root. In either case, for each signature verification process, the HSM 130 generally receives one certificate in the necessary certificate pair from the host device 100 and already has the other certificate in the necessary certificate pair from the previous signature verification. After each signature verification process, the HSM 130 generally deletes the certificate that is not necessary for the next signature verification.

Particularly, for each respective subordinate certificate in the certificate chain, the method 400 begins with receiving, with the HSM, and storing in a memory of the HSM, a first certificate of a respective certificate pair including (i) the respective subordinate certificate and (ii) a respective signer certificate of a respective entity that issued the respective subordinate certificate (block 410). Particularly, for each respective signature verification process, the host processor 110 operates the HSM driver 160 to transmit one of the certificates of a certificate pair necessary for the respective signature verification to the HSM 130. The cryptoprocessor 140 receives, via the host communication interface 170, the certificate and stores the received certificate in the HSM memory 150.

In the case that the sequence of signature verifications proceeds from root to leaf, the received certificate in each signature verification process is the respective subordinate certificate having the signature that is to be verified. In at least one embodiment, the cryptoprocessor 140 writes the received certificate to the subordinate certificate slot 522.

Conversely, in the case that the sequence of signature verifications proceeds from leaf to root, the received certificate in each signature verification process is the respective signer certificate of the signer/issuer entity that signed and issued the respective subordinate certificate having the signature that is to be verified. In at least one embodiment, the cryptoprocessor 140 writes the received certificate to the signer certificate slot 524. However, in the final signature verification process, the signer certificate is the root certificate, which may already be stored in the HSM memory 150 e.g., in the root certificate slot 526, but was previously received at some earlier point in time.

With continued reference to FIG. 4, for each respective subordinate certificate in the certificate chain, the method 400 continues with storing, in the memory of the HSM, a second certificate in the respective certificate pair that was previously received by the hardware security module (block 420). Particularly, for each respective signature verification process, the HSM memory 150 already stores the other certificate of the certificate pair necessary for respective signature verification. The already stored certificate was previously received, e.g., in the previous signature verification or at some other earlier time.

In the case that the sequence of signature verifications proceeds from root to leaf, the already stored certificate is generally the signer certificate of the certificate pair necessary for the respective signature verification. Thus, in the first signature verification process of the method 400, the already stored certificate is the root certificate, e.g., stored in the root certificate slot 526 of the HSM memory 150. Alternatively, if the root certificate is not already permanently stored, the root certificate must be initially received from the host device 100 and stored in the HSM memory 150, e.g., in the root certificate slot 526. In the each subsequent signature verification process, the already stored certificate is the previously received (and validated) subordinate certificate from the previous signature verification.

Conversely, in the case that the sequence of signature verifications proceeds from leaf to root, the already stored certificate is the respective subordinate certificate having the signature that is to be verified. In the first signature verification process of the method 400, this certificate having the signature that is to be verified must be initially received from the host device 100. However, in the each subsequent signature verification process, the respective subordinate certificate having the signature that is to be verified is already stored in the HSM memory 150 from the previous signature verification.

For each respective subordinate certificate in the certificate chain, the method 400 continues with verify, with the HSM, a signature of the respective subordinate certificate using the respective signer certificate (block 430). Particularly, at this point in each validation process of the method 400, the HSM memory 150 stores the respective subordinate certificate having the signature that is to be verified (e.g., in the subordinate certificate slot 522) and the respective signer certificate (e.g., in the signer certificate slot 524). With these certificates available in the HSM memory 150, the cryptoprocessor 140 validates the respective subordinate certificate using the respective signer certificate. More particularly, the cryptoprocessor 140 verifies the signature of the respective subordinate certificate using the public key of the respective signer certificate by executing a corresponding public-key verification algorithm (e.g., RSA PKCS 1.5 or PSS signature verification) in the program code 152. The cryptoprocessor 140 determines that the respective subordinate certificate is provisionally valid in response to the signature being verified.

In at least some embodiments, the cryptoprocessor 140 performs additional steps to validate the respective subordinate certificate, beyond merely verifying the signature. For example, in at least one embodiment, the cryptoprocessor 140 checks whether the current time and date is within the validity period of the certificate. Additionally, in some embodiments, the cryptoprocessor performs various other validity checks on the data of the certificate, such as checking the formatting of the data. In another example, the cryptoprocessor 140 performs basic constraint checks to determine if a sub-CA is allowed to sign other certificates. As yet another example, the cryptoprocessor 140 examines various certificate extension data to determine what type of certificates the CA can sign, or if able to sign data, what data may be signed, or in general what operation the entity is allowed to perform. These constrains will also be contained in the signed certificate data.

For each respective subordinate certificate in the certificate chain, the method 400 continues with deleting the second certificate of the respective certificate pair from the memory of the HSM if the second certificate of the respective certificate pair is one of the subordinate certificates of the certificate chain (block 440). Particularly, after the signature of the respective subordinate certificate is validated, the cryptoprocessor 140 deletes from the HSM memory 150 the certificate of the respective certificate pair that will not be necessary for the next signature verification process, unless it is the root certificate, which is to be permanently maintained in the HSM memory 150. Conversely, the certificate of the respective certificate pair that will be necessary for the next signature verification process is retained in the HSM memory 150 for usage in the next signature verification process.

In the case that the sequence of signature verifications proceeds from root to leaf, the deleted certificate is generally the signer certificate of the certificate pair that was used in the previous signature verification. In the first signature verification process of the method 400, the signer certificate that was used in the previous signature verification is the root certificate. In at least some embodiments, the root certificate may be retained in memory (i.e., no certificate is deleted in the first signature verification process). However, in the each subsequent signature verification process, the signer certificate of the certificate pair that was used in the previous signature verification is no longer needed and is deleted from the HSM memory 150. In at least one embodiment, the cryptoprocessor 140 achieves this deletion by moving the respective subordinate certificate from the subordinate certificate slot 522 into the signer certificate slot 524, thereby overwriting the respective signer certificate in the HSM memory 150 and opening up the memory designated to the subordinate certificate slot 522. In this way, the HSM memory 150 is primed for receipt of the next respective subordinate certificate of the certificate chain to be validated (i.e., in block 410), in the next signature verification process.

Conversely, in the case that the sequence of signature verifications proceeds from leaf to root, the deleted certificate is the respective subordinate certificate having the signature that was verified in the previous signature verification. Since this certificate will not be necessary for the next signature verification process, it is deleted from the HSM memory 150. In at least one embodiment, the cryptoprocessor 140 achieves this deletion by moving the respective signer certificate from the signer certificate slot 524 into the subordinate certificate slot 522, thereby overwriting the respective subordinate certificate in the HSM memory 150 and opening up the memory designated to the signer certificate slot 524. In this way, the HSM memory 150 is primed for receipt of the next respective signer certificate of the certificate chain for the next signature verification process.

With reference again to FIG. 5, in at least some embodiments, the HSM 130 incorporates a provisional certificate list 530 which permanently or semi-permanently identifies certificates that have been previously provisionally validated, so as to avoid the need for revalidation of these certificates. The provisional certificate list 530 is a data structure on the HSM memory 150 that identifies each certificate that has been previously provisionally validated. In at least one embodiment, provisional certificate list 530 stores (1) the serial number for each certificate that has been previously provisionally validated and (2) a secure tag, which enables the HSM 130 rapidly confirm that a received certificate having a serial number identified in the provisional certificate list 530 is, in fact, the same certificate that was previously provisionally validated. Additionally, in at least some embodiments, the HSM 130 further stores information defining the structure of the certificate chain.

To these ends, with reference again to FIG. 4, for each respective subordinate certificate in the certificate chain, the method 400 continues with calculating, with the HSM, a secure tag for the respective subordinate certificate using a cryptographic function (block 450). Particularly, in response to the respective subordinate certificate being validated, the cryptoprocessor 140 calculates, using a cryptographic function, a respective cryptographic value (referred to herein as a "secure tag") based on the respective validated subordinate certificate. In one embodiment, the cryptoprocessor 140 calculates the secure tag in the form of a cryptographic hash using a cryptographic hash function/algorithm. In another embodiment, the cryptoprocessor 140 calculates the secure tag in the form of a Message Authentication Code (MAC) using a MAC function/algorithm.

Finally, for each respective subordinate certificate in the certificate chain, the method 400 continues with storing the secure tag in a provisional certificate list in the memory of the HSM, in association with a serial number of the respective subordinate certificate (block 460). Particularly, the cryptoprocessor 140 stores the respective secure tag for the respective validated subordinate certificate in the provisional certificate list 530 in the HSM memory 150. Additionally, the cryptoprocessor 140 also stores a respective unique identifier for the respective validated subordinate certificate in association the secure tag in the provisional certificate list 530. In at least one embodiment, the respective unique identifier is a serial number of the respective validated subordinate certificate.

As will be described in greater detail below, the provisional certificate list 530 enables the rapid revalidation or provisional validation of previously validated certificates, without needing to revalidate the signature thereof or revalidate entire certificate chain thereof. Instead, the HSM 130 simply recalculates the secure tag to confirm that a certificate having a serial number identified in the provisional certificate list 530 is, in fact, the same certificate that was previously provisionally validated.

The processes of block 410, 420, 430, 440, 450, and 460 are repeated in an iterative and sequential manner for each subordinate certificate of the certificate chain, until all subordinate certificates in the certificate chain have been validated. In some embodiments, the root certificate itself may also be validated by verifying its signature with its public key, in the manner discussed above. Finally, once all of the certificates in the certificate chain are determined to be valid, the certificate chain is considered to be provisionally valid. However, the certificate chain cannot be considered fully validated until the certificate chain is checked against a valid and trusted CRL.

Returning to FIG. 2, the method 200 continues with validating, with the HSM, a certificate revocation list (block 230). Particularly, after the certificate chain is provisionally validated, the certificates of the certificate chain must be compared against a valid and trusted CRL (certificate revocation list). A CRL comprises a list of unique identifiers (e.g., serial numbers) that have been revoked. All certificates in the certificate chain validation must be checked to ensure that they are not named in the CRL. The HSM 130 recognizes one version of the CRL as being valid at any given time, and this CRL is registered with the HSM 130 by either (1) storing the valid CRL in its entirety in the HSM memory 150 or (2) calculating a secure tag from the CRL and storing this secure tag, a serial number, and a version number in the HSM memory 150.

Much like a certificate, the CRL is also signed data, signed by another entity in the PKI. Thus, CRL must also be validated. If the most recent version of the CRL has not yet registered with the HSM 130, then the certificate chain of the CRL must be validated and registered with the HSM 130. Likewise, if there is a new version of the CRL compared to a currently registered version, then the new version must be validated and registered with the HSM 130. In some embodiments, the CRL may include a version number that can be compared to determine whether there is a new version of the CRL.

Figure 6:
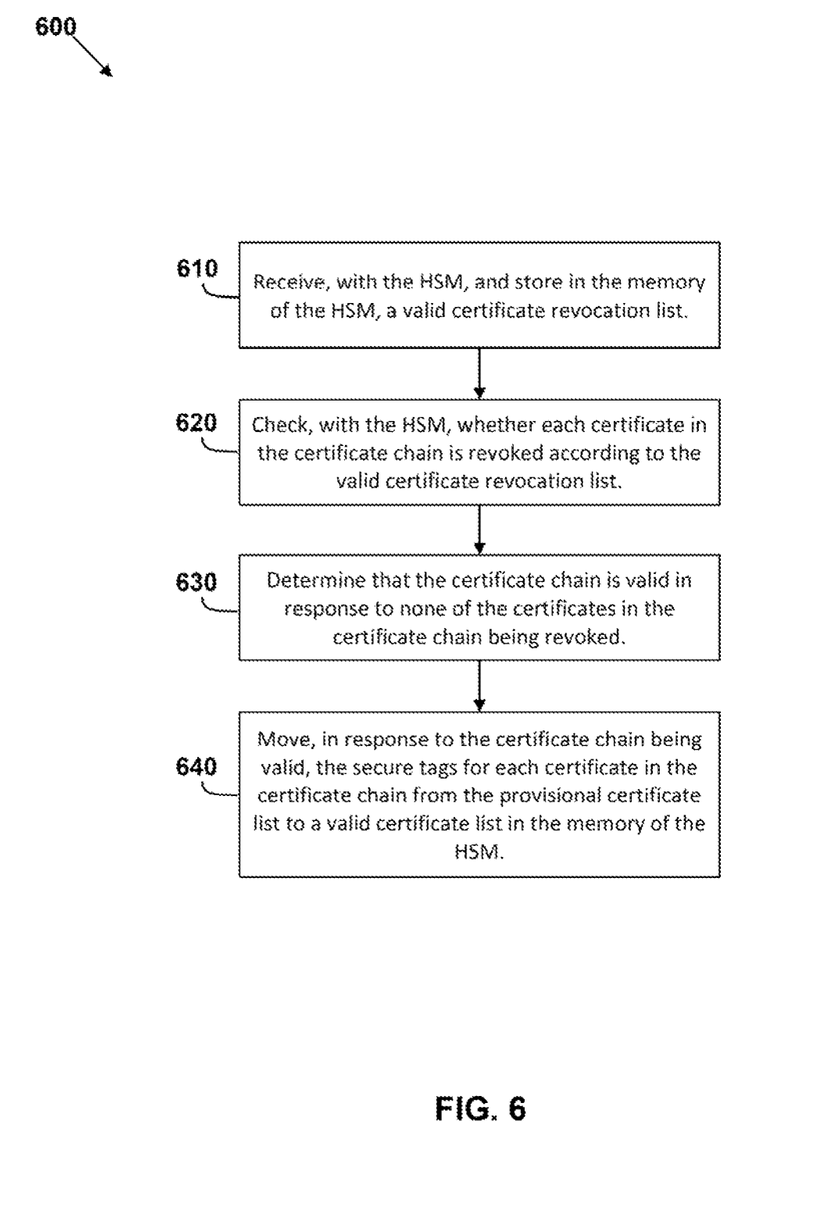
FIG. 6 shows a method for fully validating a provisionally validated certificate chain.

To this end, the host processor 110 of the host device 100 (or the cryptoprocessor 140 of the HSM 130) identifies a further certificate chain for the relevant CRL, using the same procedure described above with respect to block 210. Next, the HSM 130 provisionally validates the certificate chain of the CRL using the same procedure described above with respect to blocks 220 and the method 400. Additionally, the signature on the CRL itself must be similarly verified, in addition to those of the certificate chain thereof. In order to fully validate the CRL, the certificates of the certificate chain of the new CRL must be compared with the serial numbers contained in the new CRL itself to determine whether any certificates in the certificate chain have been revoked. Particularly, the cryptoprocessor 140 compares the serial numbers of each certificate in the certificate chain of the new CRL with the revoked serial numbers listed in the new CRL itself. These comparisons are performed by the cryptoprocessor 140 in a similar manner that will be described in greater detail below with respect to block 240 and a method 600. Additionally, in the case the new CRL is too large to be stored in its entirety on the HSM memory 150, the cryptoprocessor 140 performs these comparisons in a streaming fashion, in a similar manner that will be described in greater detail below with respect to block 240 and the method 600.

Once the certificate chain of the new CRL and the new CRL itself is validated, the cryptoprocessor 140 registers the new CRL with the HSM 130 by either (1) storing the new CRL in the HSM memory 150, overwriting any old CRL in the HSM memory 150 or (2) by calculating a secure tag of the new CRL and storing the secure tag with the associated serial number (and optionally a version number) for the new CRL in a certificate list 540 in the HSM memory 150 (described in greater detail below). The cryptoprocessor 140 calculates the secure tag of the new CRL using the same procedure described above with respect to block 450. If necessary, the secure tag of the new CRL may be calculated in a streaming fashion, in a similar manner that will be described in greater detail below with respect to block 240 and the method 600.

Whenever the HSM registers a CRL which is newer than the one that was previously registered, all validations must be recalculated. The cryptoprocessor 140 removes any certificates from the provisional certificate list 530 or the certificate list 540 that are listed in the newly registered. Any remaining entries from the provisional certificate list 530 or the certificate list 540 will need to be revalidated, in case any parent certificate higher up in the chain was revoked. Storing serial numbers alongside the secure tags in the certificate list can speed up this operation. One method to perform this re-checking against a new CRL is to begin validation afresh, given only the roots trusted by the HSM 130.

The method 200 continues with fully validating the certificate chain by checking, with the HSM, the provisionally validated certificate chain against the validated certificate revocation list (block 240). Particularly, in order to fully validate the provisionally validated certificate chain, the certificates of the certificate chain must be compared with the serial numbers contained in a valid and trusted CRL that is registered with the HSM 130. To this end, the HSM 130 compares the serial numbers of each certificate in the certificate chain with the serial numbers listed in the registered CRL to determine whether any certificates in the certificate chain have been revoked. If it is determined that none of the certificates of the certificate chain are revoked, the HSM 130 determines the certificate chain to be fully validated. One embodiment of this process is detailed below.

FIG. 6 shows 600 a method for fully validating a provisionally validated certificate chain. The method 600 begins with a step of receiving, with the HSM, and storing in the memory of the HSM, a valid certificate revocation list (block 610). Particularly, in the case that the currently registered CRL is not stored locally in the HSM memory 150, the host processor 110 operates the HSM driver 160 to transmit the CRL to the HSM 130. The cryptoprocessor 140 receives, via the host communication interface 170, the CRL and stores the CRL in the HSM memory 150. The cryptoprocessor 140 recalculates the secure tag for the received CRL and compares it with the stored secure tag in the certificate list 540 to confirm that the received CRL is, in fact, the same CRL that was previously validated.

In at least some embodiments, the CRL is too large to be stored in its entirety on the HSM memory 150. In this case, the processes of block 610 and block 620 (below) must be repeated for a plurality of smaller portions (or chunks) of the CRL. To this end, for each respective portion of the CRL, the host processor 110 operates the HSM driver 160 to transmit the respective portion of the CRL to the HSM 130. The cryptoprocessor 140 receives, via the host communication interface 170, the respective portion of the CRL and stores the respective portion of the CRL in the HSM memory 150. For each respective portion of the CRL, the cryptoprocessor 140 calculates and/or updates a partially calculated secure tag for the CRL. Once the whole CRL has been seen by the HSM 130, the cryptoprocessor 140 compares the complete recalculated secure tag it with the stored secure tag in the certificate list 540 to confirm that the received CRL is, in fact, the same CRL that was previously validated.

The method 600 continues with a step of checking, with the HSM, whether each certificate in the certificate chain is revoked according to the valid certificate revocation list (block 620). Particularly, for each respective certificate in the certificate chain, the cryptoprocessor 140 checks whether the respective certificate is revoked according to the certificate revocation list by comparing the respective serial number of the respective certificate with each serial number listed in the currently registered CRL. If the respective serial number of the respective certificate is listed in the CRL, then the cryptoprocessor 140 determines that the respective certificate has been revoked. Conversely, if the respective serial number of the respective certificate is not listed in the CRL, then the cryptoprocessor 140 determines that the respective certificate has not been revoked. In the case that the CRL is not permanently stored locally in the HSM memory 150, once all the certificates in the certificate chain have been check against the CRL, the cryptoprocessor 140 deletes the CRL from the HSM memory 150.

As noted above, in at least some embodiments, the CRL is too large to be stored in its entirety on the HSM memory 150. In this case, the processes of block 610 (above) and block 620 must be repeated for a plurality of smaller portions (or chunks) of the CRL. To this end, the cryptoprocessor 140 checks whether each respective certificate is revoked according to the certificate revocation list by, for each respective portion of the CRL, comparing the respective serial number of the respective certificate with each serial number listed in the respective portion of the CRL. Once all the certificates in the certificate chain have been checked against the respective portion of the CRL, the cryptoprocessor 140 deletes the CRL from the HSM memory 150. This process is repeated for every portion of the CRL and, if a serial number of a respective certificate in the certificate chain is listed in any portion of the CRL, then the cryptoprocessor 140 determines that the respective certificate has been revoked. Conversely, if the respective serial number of the respective certificate is not listed in any portion of the CRL, then the cryptoprocessor 140 determines that the respective certificate has not been revoked.

Once the whole CRL has been seen by the HSM 130, the HSM 130 determines if the CRL itself is valid. This is done by updating a hash value for each component of the streamed CRL, and checking a signature, or, if the CRL has previously been seen by the HSM 130, the HSM 130 may perform this determination quickly by checking a recalculating the secure tag for the CRL and checking it against the secure associated with a previously validated CRL. The secure tag value will also be updated as the CRL is streamed into the HSM 130.

The method 600 continues with a step of determining that the certificate chain is valid in response to none of the certificates in the certificate chain being revoked (block 630). Particularly, the cryptoprocessor 140 determines that the certificate chain is fully valid in response to none of the certificates in the certificate chain being revoked according to the currently registered CRL. Conversely, the cryptoprocessor 140 determines that the certificate chain is invalid in response to any one of the certificates in the certificate chain being revoked according to the currently registered CRL. If the certificate chain is invalid, the cryptoprocessor 140 deletes the serial numbers and secured tags corresponding to the certificates in the certificate chain from provisional certificate list 530.

Finally, the method 600 continues with a step of moving, in response to the certificate chain being valid, the secure tags for each certificate in the certificate chain from the provisional certificate list to a valid certificate list in the memory of the HSM (block 640). Particularly, in response to determining that the certificate is fully valid (or, equivalently, in response to none of the certificates in the certificate chain being revoked according to the currently registered CRL), the cryptoprocessor 140 moves the serial numbers and secure tags corresponding to the certificates in the certificate chain from the provisional certificate list 530 to the certificate list 540 (i.e., delete from the provisional certificate list 530 and write to the certificate list 540). With reference again to FIG. 5, the certificate list 540 is a data structure in the HSM memory 150 that identifies each certificate that has been previously fully validated. Much like the provisional certificate list 530, the certificate list 540 stores (1) the serial number for each certificate that has been previously fully validated and (2) a secure tag, which enables the HSM 130 rapidly confirm that a received certificate having a serial number identified in the certificate list 540 is, in fact, the same certificate that was previously validated.

Returning to FIG. 2, once a certificate chain is fully validated, the certificates thereof can be utilized by the HSM 130 for various cryptographic operations required by the host device 100. Particularly, in at least some embodiments, the host processor 110 operates the HSM driver 160 to transmit a certificate and other data required for a cryptographic operation to the HSM 130. The cryptoprocessor 140 receives, via the host communication interface 170, the certificate and other data and stores the certificate and other data in the HSM memory 150. The cryptoprocessor 140 performs the cryptographic operation on the data using the certificate or, in at least some cases, using a public key of the certificate.

If a certificate (or at least the contained public key) is needed to perform a cryptographic operation immediately after the chain validation thereof, then the certificate can be used directly from the HSM memory 150 after being fully validated. However, it the certificate has been deleted from the HSM memory 150 subsequent to being fully validated, then the HSM 130 must revalidate the certificate. Particularly, the HSM 130 revalidates a subordinate certificate that has previously been validated using the previously calculated secure tag, which is stored by the HSM memory 150.

Figure 7:
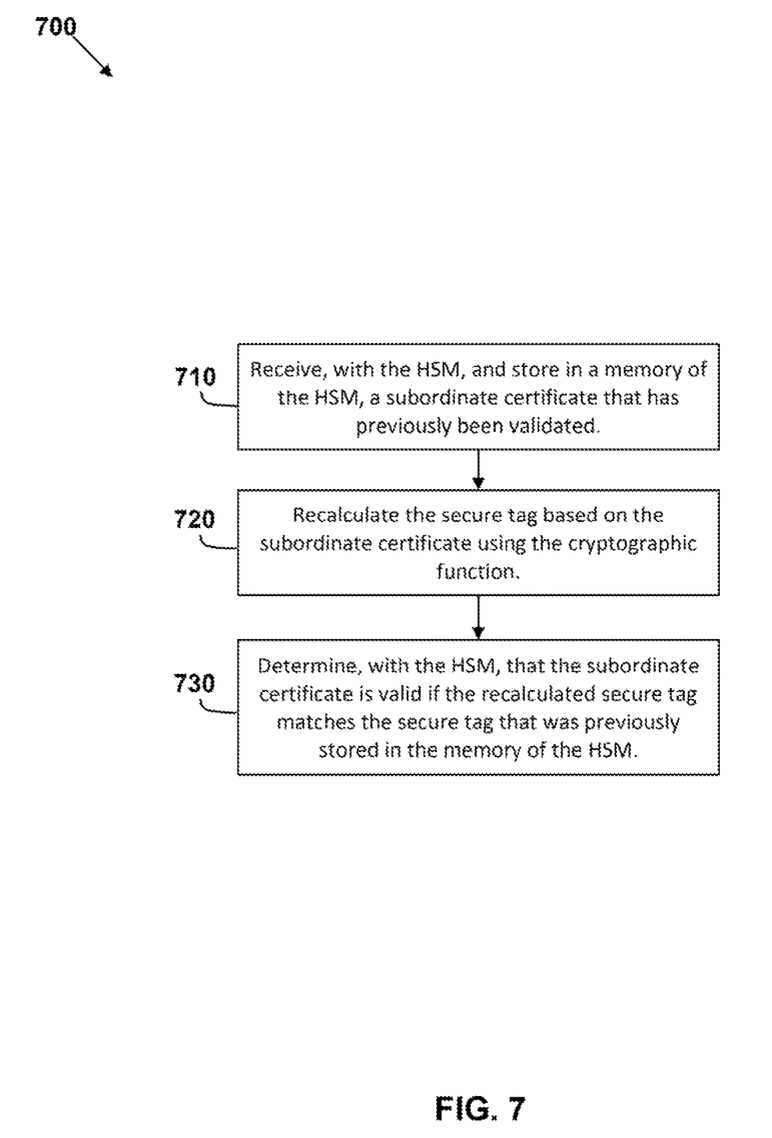
FIG. 7 shows a method for revalidating a certificate using a secure tag.

FIG. 7 shows a method 700 for revalidating a certificate using a secure tag. The method 700 has the benefit of eliminating the need to revalidate a previously validated certificate. Additionally, the method 700 has the further benefit of simplifying recovery in the case that the certificate storage slots 510, located in an insecure memory region of the host memory 120 is corrupted, because restoration of the certificate storage simply amounts to downloading the certificates again without validation.

The method 700 begins with receiving, with the HSM, and storing in a memory of the HSM, a subordinate certificate that has previously been validated (block 710). Particularly, the host processor 110 operates the HSM driver 160 to transmit a subordinate certificate to the HSM 130. The cryptoprocessor 140 receives, via the host communication interface 170, the subordinate certificate and stores the subordinate certificate in the HSM memory 150. In response to receiving the subordinate certificate, the cryptoprocessor 140 determines whether the received certificate was previously validated by checking whether a serial number of the received certificate is present in the certificate list 540, which lists all previously fully validated certificates. If the serial number of the received certificate is present in the certificate list 540, the cryptoprocessor 140 precedes with revalidation using the previously calculated secure tag. Otherwise, the cryptoprocessor 140 performs a complete chain validation, as discussed above.

The method 700 continues with recalculating the secure tag based on the subordinate certificate using the cryptographic function (block 720). Particularly, the cryptoprocessor 140 recalculates, using a cryptographic function, the secure tag based on the received certificate. In one embodiment, the cryptoprocessor 140 calculates the secure tag in the form of a cryptographic hash using a cryptographic hash function/algorithm. In another embodiment, the cryptoprocessor 140 calculates the secure tag in the form of a Message Validation Code (MAC) using a MAC function/algorithm.

The method 700 continues with determining, with the HSM, that the subordinate certificate is valid if the recalculated secure tag matches the secure tag that was previously stored in the memory of the HSM (block 730). Particularly, the cryptoprocessor 140 determines that the received certificate is valid if the value of the recalculated secure tag matches the value of the secure tag that was previously stored in certificate list 540 in the HSM memory 150. In this way, the cryptoprocessor 140 uses the secure tag to rapidly determine that the previously validated certificate is, in fact, the same certificate that was previously validated.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for using a hardware security module, the method comprising:
 identifying a first certificate chain comprising a root certificate and a plurality of subordinate certificates;
 storing, in a memory of a host device, the root certificate and the plurality of subordinate certificates of the first certificate chain, the host device including the hardware security module;
 validating, with the hardware security module, the first certificate chain, the validating including, for each respective subordinate certificate in the plurality of subordinate certificates:
  receiving from a processor of the host device, and storing in a memory of the hardware security module, a first certificate in a respective certificate pair including (i) the respective subordinate certificate and (ii) a respective signer certificate of a respective entity that issued the respective subordinate certificate;
  storing, in the memory of the hardware security module, a second certificate in the respective certificate pair that was previously received by the hardware security module;
  verifying, with a processor of the hardware security module, a signature of the respective subordinate certificate using the respective signer certificate;
  calculating, in response to the respective subordinate certificate being successfully verified, a respective cryptographic value based on the respective subordinate certificate using a cryptographic function;

storing the respective cryptographic value in a first data structure in the memory of the hardware security module; and deleting, after verifying the signature, the second certificate from the memory of the hardware security module if the second certificate is one of the plurality of subordinate certificates; and revalidating, with the hardware security module, a particular subordinate certificate in the plurality of subordinate certificates by:

receiving, and storing in the memory of the hardware security module, the particular subordinate certificate;

recalculating the respective cryptographic value based on the particular subordinate certificate using the cryptographic function; and determining that the particular subordinate certificate is valid if the recalculated respective cryptographic value matches the respective cryptographic value that was previously stored in the memory of the hardware security module.

2. The method according to claim 1, wherein the first certificate in the respective certificate pair is the respective subordinate certificate and the second certificate in the respective certificate pair is the respective signer certificate.

3. The method according to claim 1, wherein the first certificate in the respective certificate pair is the respective signer certificate and the second certificate in the respective certificate pair is the respective subordinate certificate.

4. The method according to claim 1, the verifying the signature of each respective subordinate certificate further comprising:

verifying the signature of the respective subordinate certificate using a public key of the respective signer certificate.

5. The method according to claim 1, wherein the respective cryptographic value is one of a cryptographic hash and a message authentication code.

6. The method according to claim 1, the validating the first certificate chain further comprising, for each respective subordinate certificate:

storing a respective unique identifier of the respective subordinate certificate in the first data structure in the memory of the hardware security module in association with the respective cryptographic value.

7. The method according to claim 6, wherein the respective unique identifier is a serial number of the respective subordinate certificate.

8. The method according to claim 1, the validating the first certificate chain further comprising:

checking, with the hardware security module, for each respective certificate in the first certificate chain, whether the respective certificate is revoked according to a certificate revocation list; and moving, in response to none of the certificates in the first certificate chain being revoked, the respective cryptographic value for each respective certificate in the first certificate chain from the first data structure to a second data structure in the memory of the hardware security module.

9. The method according to claim 1, the validating the first certificate chain further comprising:

receiving, and storing in the memory of the hardware security module, a certificate revocation list;

checking, with the hardware security module, for each respective certificate in the first certificate chain, whether the respective certificate is revoked according to the certificate revocation list; and determining that the first certificate chain is valid in response to none of the certificates in the first certificate chain being revoked.

10. The method according to claim 9, the checking further comprising:

comparing a respective unique identifier of the respective certificate with a plurality of unique identifiers listed in the certificate revocation list; and determining that the respective certificate is revoked in response to the respective unique identifier of the respective certificate matching a unique identifier in the plurality of unique identifiers listed in the certificate revocation list.

11. The method according to claim 10 further comprising, for each respective portion of a plurality of portions of the certificate revocation list:

receiving, and storing in the memory of the hardware security module, the respective portion of the certificate revocation list;

comparing the respective unique identifier of the respective certificate with a respective plurality of unique identifiers listed in the respective portion of the certificate revocation list; and deleting, after the comparing, the respective portion of the certificate revocation list from the memory of the hardware security module.

12. The method according to claim 9 further comprising:

identifying a second certificate chain for the certificate revocation list; and validating, with the hardware security module, the second certificate chain.

13. The method according to claim 1 further comprising:

storing, in a memory of a host device, the root certificate and the plurality of subordinate certificates of the first certificate chain, wherein the hardware security module receives each of the respective subordinate certificates from the host device during the validating of each of the respective subordinate certificates.

14. The method according to claim 13, wherein the host device is a vehicle controller.

15. The method according to claim 1 further comprising:

performing, using the hardware security module, after validating the first certificate chain, a cryptographic operation using a certificate included in the first certificate chain.

16. The method according to claim 15, the identifying further comprising:

identifying the first certificate chain based on the certificate to be used for the cryptographic operation.

* * * * *